United States Patent Office 3,389,965
Patented June 25, 1968

3,389,965
PROCESS FOR PRODUCING HYDROGEN BY REACTION OF A HYDROCARBON AND STEAM EMPLOYING A RHENIUM-CONTAINING CATALYST
Hendrikus de Ruiter, Pieter A. van Weeren, and Willem C. J. Quik, Amsterdam, Netherlands, assignors to Shell Oil Company, New York, N.Y., a corporation of Delaware
No Drawing. Filed May 25, 1964, Ser. No. 370,063
Claims priority, application Netherlands, May 30, 1963, 293,400; Apr. 19, 1964, 6,404,815
9 Claims. (Cl. 23—212)

ABSTRACT OF THE DISCLOSURE

Rhenium-containing catalysts for the production of hydrogen by the reaction of hydrocarbon and steam are highly active, very resistant to sulfur poisoning and promote the reaction with substantially no formation of soot. Activity and catalyst life is increased by the use of promoters such as the metals and metal compounds of Group I-B and Group V-III of the Periodic Table.

---

This invention relates to a process for the preparation of hydrogen or hydrogen-containing gas mixtures by the catalytic conversion of hydrocarbons in the presence of steam.

The preparation of hydrogen or hydrogen-containing gas mixtures by the conversion of hydrocarbons with steam is known to those familiar in the art. The catalyst usually employed in the conversion is nickel. Nickel is very active but is not resistant to sulfur, consequently, when it is used in the processing of sulfur-containing hydrocarbons, its acitivity is very soon lost.

This sensitivity of nickel catalysts to sulfur is a disadvantage in that the hydrocarbon fractions available to the petroleum industry usually contain sulfur. For practical operation of the process, it is necessary to first subject the hydrocarbon fraction to a thorough desulfurization process. For example, a sulfur-containing naphtha is first subjected to treatment with sulfuric acid in order to remove the major proportion of the sulfur compounds, after which the acid-treated naphtha is completely desulfurized by catalytic means.

It has now been found that hydrocarbon fractions, whether or not they contain sulfur compounds, can be converted into hydrogen or hydrogen-containing gas mixtures by reaction with steam by means of a rhenium catalyst. The rhenium catalyst is highly active, which permits the use of relatively low temperatures, and is very resistant to poisoning by sulfur. Thus, in the process of the invention, hydrogen or hydrogen-containing gas mixtures are produced by the conversion of hydrocarbons by means of steam at an elevated temperature in the presence of rhenium and/or a rhenium-containing composition as the catalyst.

As already mentioned, the present catalyst has a high resistance to sulfur, which means that there is no limit to the choice of starting materials so far as the sulfur content thereof is concerned. The rhenium catalyst can be employed in various forms, such as, for example, a metal and/or as an oxide. The sulfide form, however, is preferred, as it has been found that rhenium sulfide usually has the highest activity.

It has further been found that activity and life of the rhenium catalysts can be increased by the use of promoters, such as the metals of Group I-B and/or the metals of Group V-III of the Periodic System of elements. Suitable promoters are silver, nickel, cobalt, copper and gold, either in the form of the metal or as compounds thereof such as the oxides or sulfides. In particular iridium is preferred as a promoter. The promoter is generally used in an amount from about 0.5% to 25% by weight.

The rhenium catalysts are preferably supported on a carrier. A preferred carrier is alumina, including natural or synthetic alumina. The presence of a certain amount of other oxides in the alumina is in general not detrimental. Thus the alumina can contain small amounts of silica, e.g., up to about 5% by weight and preferably no more than 0.5% by weight silica. Carriers with strongly acidic properties, such as silica-alumina cracking catalysts, are in general, not very suitable. In general, the carrier-supported catalysts will contain 1–25% weight, and preferably 5–15% weight, of rhenium.

The rhenium catalysts can be prepared in any of the conventional ways. For example, the carrier material is impregnated with a solution of a rhenium salt, either with or without metal salts of promoters. After drying, the salts are converted by calcination into the corresponding metal oxides, which may then be converted into metals by reduction with hydrogen at a temperature of 200–400° C. After cooling, which preferably takes place in the presence of hydrogen, the metal present on the carrier can be sulfided by contacting it, again preferably in the presence of hydrogen, with, for example, hydrogen sulfide and/or a mercaptan, such as butylmercaptan. The sulfiding operation can also be applied directly to the metal oxides.

The sulfur compounds employed for the sulfiding step are preferably organic sulfides. Sulfur-containing hydrocarbon oils can also be used and these include hydrocarbon-oil fractions boiling in the range from 0° to 350° C., such as light gasolines, naphthas, kerosenes and gas oils. Preferred are straight-run hydrocarbon fractions. As a rule, sulfiding with sulfur-containing hydrocarobn fractions will be carried out in the liquid phase and in the presence of hydrogen. A hydrogen-containing gas may be used in place of pure hydrogen.

Suitable starting materials for the preparation of hydrogen and hydrogen-containing gas mixtures are pure, normally gaseous and/or liquid hydrocarbons and mixtures of pure hydrocarbons as well as petroleum fractions, all with boiling points, or final boiling points, below 200° C. Very suitable, for example, are $C_5$ to $C_7$ fractions, whether aliphatic or naphthenic or aromatic in type, light straight-run fractions and light naphtha fractions, as well as hydrocarbon mixtures obtained by catalytic reforming or by the steam-cracking of light hydrocarbon-oil fractions.

As mentioned hereinbefore, the rhenium catalysts are resistant to sulfur, which is an advantage in that sulfur-containing hydrocarbons or hydrocarbon mixtures can be employed as starting materials without a preliminary desulfurization treatment. In cases where rhenium is used in its sulfide form, it is even advantageous for a certain amount of sulfur compounds, for example 0.01–10% weight, to be present in the starting material in order to counteract any loss of sulfur from the catalyst.

It has further been found that the presence of sulfur componuds in the feed, for instance, of more than 200 p.p.m. (calculated as sulfur), causes the activity of the rhenium catalyst to increase. In addition, the formation of coke on the catalyst is thus counteracted.

Organic sulfur compounds can even be employed as starting materials themselves. Thus with the aid of the present catalyst, benzothiophene can be converted in the presence of steam into toluene, which can then further be converted by means of steam to form benzene. The gas mixtures produced in these reactions consist of hydrogen, carbon dioxide and hydrogen sulfide.

In addition, organic compounds containing other elements in addition to carbon and hydrogen can be converted to hydrogen. Thus, for example, oxygenated compounds such as alcohols, ethers, and the like may be used. In general, however, light petroleum fractions are less expensive starting materials and are preferred.

An advantage of the present rhenium catalysts is that the conversion of the hydrocarbons with steam can already be effected at relatively low temperatures, i.e., between 400 and 600° C. At a working temperature of about 450 to 550° C. gas mixtures are obtained which contain mainly hydrogen and hydrocarbons with a lower molecular weight than that of the starting hydrocarbons. By a suitable choice of the starting material gas mixtures can be prepared under these temperature conditions which contain, not only hydrogen, but also hydrocarbons of higher value than those in the starting materials. Thus, light straight-run tops fractions may be converted in good yields into a mixture of hydrogen, propane and butane. Heavier fractions yield, in addition to propane and butane, liquid products with a reasonable octane number as well. From toluene, hydrogen and benzene are obtained.

It is observed that the hydrogen-containing gas mixtures obtained under these conditions of relatively low temperature can, in many cases, be applied as such or after a simple purification for hydrogenation purposes, for instance in the petroleum industry. After separation of the higher-boiling hydrocarbons and after removal of impurities, such as carbon dioxide and hydrogen sulfide, these gas mixtures are suitable for the same industrial applications as those for which propane and butane are used.

A certain disadvantage linked up with the application of temperatures between 400 and 600° C., however, is that the conversion of the hydrocarbon material is not complete. For, the conversions are as a rule between 30 and 60%.

At temperatures above 600° C. the hydrocarbon starting material is completely, or substantially completely, converted. Consequently, the hydrogen content of the gas mixture formed is considerably higher. At a temperature of about 700 to 800° C. the hydrogen content increases even further and the gas mixtures obtained only contain methane as hydrocarbon component, the carbon monoxide content having become considerably higher as compared with the carbon dioxide content. Accordingly as the reaction temperature is raised, i.e., above 800° C., the gas mixtures formed contain less and less methane and predominantly carbon monoxide.

The hydrogen- and carbon-monoxide-containing gas mixtures that can be obtained at a temperature of about 700 to 800° C. are, for instance, suitable starting materials for the preparation of methanol. The conversion of carbon monoxide into methanol may be effected in two reaction steps.

In the first step carbon monoxide is converted with methyl alcohol into methyl formate according to the equation:

in the second step the methyl formate is converted with hydrogen into methyl alcohol according to:

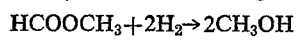

Starting from a gas mixture containing hydrogen and carbon monoxide the preparation of methanol leaves practically only carbon monoxide-free hydrogen. In this way a hydrogen-containing gas mixture is obtained, which, on account of the absence of carbon monoxide, may be worked up to pure hydrogen in a simple manner.

The present process may be effected in several steps, in successive steps, as a rule, higher temperatures being applied. The process may, if desired, be preceded by a catalytic treatment of the hydrocarbons with steam in the presence of a rhenium catalyst at a temperature of 600° C. or lower.

The conversion of the hydrocarbons with steam according to the present invention may, if desired, be followed by an after-treatment at 350–500° C. in the presence of steam—the so-called "shift" reaction—in order to convert the carbon monoxide present in the hydrogen-containing gas into carbon dioxide and additional hydrogen according to the reaction:

The present conversion of hydrocarbons with steam being an endothermal reaction it may be of advantage, with a view to the heat balance and for other reasons, to effect the reaction in the presence of oxygen or an oxygen-containing gas, such as air. Preferably steam will be applied in excess as referred to oxygen (calculated in moles).

An advantage of the present process is that the hydrogen-containing gases contain no, or substantially no, soot.

The amount of steam employed is usually 1–40 moles and preferably 2–30 moles per mole of starting material.

The present process is preferably carried out under pressure. This is advantageous in that correspondingly smaller reactors may be used quite satisfactorily, while at the same time hydrogen is produced under pressure, thus sparing expensive gas compressors. There are many processes in the oil and chemical industries that require hydrogen under pressure—desulfurization of high-boiling hydrocarbon-oils, such as gas oils and lubricating oils and the hydrocracking of hydrocarbon-oils being two examples. In general, the higher the pressures employed in the present process, the higher the hydrocarbon conversions will be. For practical reasons, however, no pressure above 60 atm. absolute will usually be employed, the preferred pressure range being between 5 and 40 atm. absolute.

For a number of applications the hydrogen-containing gas mixture obtained by the present process may be used as it is. For processes where hydrogen of greater purity is required, undesirable components, such as carbon dioxide, hydrogen sulfide, or hydrocarbons, can be wholly or partly removed by known techniques.

The present process can be carried out in any of the various ways known for conducting continuous catalytic processes. This may comprise using the catalyst in a fixed bed, moving bed, or in a fluidized state. One or more beds of catalyst can be used if desired.

EXAMPLE I

A straight-run tops fraction with a final boiling point of 72° C. was passed over an alumina-supported rhenium catalyst at 500° C. under a pressure of 16 atm. absolute at a specific velocity of 0.25 liter per liter of catalyst per hour. The catalyst consisted of particles having an average diameter of 1.5 mm. which were arranged in the form of a fixed bed. The catalyst, which contained 7.7 parts by weight rhenium per 100 parts by weight of alumina, had been previously sulfided by passing a mixture of hydrogen and hydrogen sulfide over it for three hours at 375° C. Steam was introduced into the reactor together with the straight-run tops fraction in the proportion of 4 kg. of steam per liter of tops fraction. In addition, 30 liters of hydrogen sulfide per liter of catalyst per hour were used. After four hours the conversion was 42% weight.

The converted product comprised 15% weight hydrogen and 38% weight propane and butane. Hydrogen content of the $C_2$ and lighter gases, after removal of carbon dioxide, was 87% weight. The $C_2$ and lighter portion of the reaction product comprises hydrogen, methane and ethane.

After forty hours the conversion had dropped to 29%; however, the composition of the converted product and the concentration of hydrogen were both unchanged.

EXAMPLE II

Under the same conditions as described in Example I, an experiment was carried out with the same straight-run tops fraction, but this time with a catalyst containing 7.7 parts by weight of rhenium and 5 parts by weight of copper oxide per 100 parts by weight of alumina. After four hours the conversion was 44% and after forty hours 33%. The copper oxide, therefore, appears to have a good effect on the stability of the catalyst.

EXAMPLE III

Under the same conditions as described in Example I an experiment was carried out with the same straight-run fraction, but this time with a rhenium catalyst containing 7.7 parts by weight of rhenium and 5 parts by weight of gold oxide per 100 parts by weight of alumina. After four hours the conversion was 44% and after forty hours 33%. Thus, gold oxide also has a good effect on the stability of the catalyst.

EXAMPLE IV

An experiment was carried out in the same way as described in Examples II and III, but with a catalyst containing 2.5 parts by weight of cobalt oxide per 100 parts by weight of alumina and 7.7 parts by weight of rhenium. After four hours the conversion was 64% and after forty hours 45%. Cobalt oxide appears to have an even better effect than copper oxide or gold oxide.

EXAMPLE V

An experiment was carried out in the same way as in Examples II–IV, but with a catalyst containing 5 parts by weight of silver oxide per 100 parts by weight of alumina and 7.7 parts by weight of rhenium. After four hours the conversion was 64% and after forty hours 48%. Silver oxide therefore appears to be slightly more active even than cobalt oxide.

The converted products obtained in Example I–V contained no carbon monoxide.

EXAMPLE VI n-Pentane, with a sulfur content of 200 p.p.m., was passed over an alumina-supported rhenium catalyst with steam at 500° C., 700° C. and 800° C., under a pressure of 20 atm. absolute and at a specific velocity of 0.3 liter per liter of catalyst per hour. The catalyst was arranged in the form of a fixed bed and consisted of particles having an average diameter of 1.5 mm. and containing 7.7 p.b.w. rhenium and 5 p.b.w. silver oxide per 100 p.b.w. alumina. It had been previously sulfided by passing a mixture of hydrogen and hydrogen sulfide over it for three hours at 375° C. and under a pressure of 10 atm. absolute. Steam was introduced in the reactor together with the pentane in the proportion of 2.5 kg. steam per liter of pentane.

The conversion and the composition of the converted products—after removal of CO and $CO_2$—are given in Table I.

TABLE I

| Reaction temperature, °C | 500 | 700 | 800 |
| --- | --- | --- | --- |
| Conversion, Percent | 57 | 100 | 100 |
| Composition of product, mole/100 moles of n-pentane converted: | | | |
| Hydrogen | 398 | 1,088 | 1,337 |
| Methane | 39 | 250 | 147 |
| Ethane | 52 | | |
| Propane | 72 | | |
| Butane | 13 | | |

From the analyses of the reaction products it appears that at 500° C. a conversion of only 57% was reached, while it was 100% at 700° C. and 800° C. As to the composition of the reaction product, it is seen that at 700° C. and 800° C. considerably more hydrogen has been formed. In addition, the hydrocarbon is, at these higher reaction temperatures, exclusively present as methane, unlike the gas obtained at 500° C., which contains relatively large quantities of ethane, propane and butane.

EXAMPLE VII

A few comparative experiments were effected, in which n-pentane, in some cases together with sulfur, in the form of carbon sulfide, was passed over an alumina-supported rhenium catalyst at 800° C. in the presence of steam, under a pressure of 20 atm. absolute and with a specific velocity of 0.5 liter per liter of catalyst per hour.

The compositions of the catalysts and the results obtained with them are listed in Table II. It appears from these results that in all cases complete conversion of the starting material was realized, i.e., the reaction products consisted exclusively of hydrogen, carbon monoxide, carbon dioxide and methane. Therefore, as a measure of the activity of the various catalysts was chosen the hydrogen purity of the gas, calculated as $$\frac{\% \, vH_2}{\% \, vH_2 + \% \, vCH_4} \cdot 100$$

From experiments 1 and 2 it appears that the hydrogen purity undergoes hardly any change if the mol. ratio of water to pentane is reduced from 20 to 10. Upon comparison of experiments 2 and 3 it is seen that the presence of carbon sulfide during the conversion is favorable: the hydrogen purity is raised considerably. Even better results are obtained when iridium is used in the rhenium catalyst as a promoter: the hydrogen purity is then 98% v on an average and the catalyst stability is excellent.

TABLE II.—CONVERSION OF N-PENTANE WITH STEAM

| Exp. no. | Catalyst | Sulfur,[1] p.p.m. (vol.) | Temperature, °C. | Hydrogen purity,[2] percent v, after run hour | | | | | Conversion, percent | Steam, $H_2O:C_5$ mol. ratio |
| --- | --- | --- | --- | --- | --- | --- | --- | --- | --- | --- |
| | | | | 1 | 3 | 4 | 5 | 6 | | |
| 1 | Re:$Al_2O_3$=3.8:100 | | 800 | 70 | 70 | 70 | | | 100 | 10 |
| 2 | Re:$Al_2O_3$=3.8:100 | | 800 | | 69 | 69 | 69 | | 100 | 20 |
| 3 | Re:$Al_2O_3$=3.8:100 | 200 | 800 | 95 | 95 | 93 | 92 | 91 | 100 | 20 |
| 4 | Re:Ir:$Al_2O_3$=3.8:1.9:100 | 200 | 800 | 98 | 99 | 97 | 97 | 98 | 100 | 20 |

[1] In the form of carbon sulfide.
[2] $H_2/H_2+C_1+C_2 \cdot 100\%$ v.

We claim:
1. A process for the production of hydrogen which comprises reacting a hydrocarbon and from about 1 to 40 moles of steam per mole of hydrocarbon at a temperature of about 400° C. to 800° C. in the presence of catalyst comprising rhenium, supported on an alumina carrier, the supported catalyst having from about 1–25% weight rhenium.

2. The process according to claim 1 wherein the catalyst is rhenium sulfide supported on alumina containing less than 5% by weight silica and the process is carried out at a pressure of about 5 to 60 atmospheres absolute.

3. The process according to claim 1 wherein the catalyst contains a promoter selected from the group consisting of a metal of Group I–B, Group V–III of the Periodic Table, and mixtures thereof.

4. The process according to claim 2 wherein the temperature is about 450 to 550° C.

5. The process according to claim 2 wherein the temperature is about 700 to 800° C.

6. The process according to claim 2 wherein the hydrocarbon boils below about 200° C.

7. The process according to claim 1 wherein the hydrocarbon contains more than 200 p.p.m. sulfur compounds calculated as sulfur.

8. The process according to claim 3 wherein the catalyst is promoted with iridium.

9. The process according to claim 1 wherein the hydrocarbon is a $C_5$–$C_7$ petroleum fraction.

(References on following page)

References Cited

UNITED STATES PATENTS

| | | | |
|---|---|---|---|
| 1,711,036 | 4/1929 | Beckley | 23—212 |
| 1,736,065 | 11/1929 | Williams | 23—212 |
| 2,143,472 | 1/1939 | Boultbee | 23—212 X |
| 2,750,261 | 6/1956 | Ipatieff et al. | 23—212 |
| 3,189,563 | 6/1965 | Hauel | 252—461 X |

OTHER REFERENCES

Hackh's "Chemical Dictionary," third ed., Revised (1944), p. 256, McGraw-Hill Book Co., Inc., New York.

"The Condensed Chemical Dictionary," 6th edition, 1956, p. 982, Reinhold Pub. Corp., New York.

OSCAR R. VERTIZ, *Primary Examiner.*

EDWARD STERN, *Assistant Examiner.*

UNITED STATES PATENT OFFICE

CERTIFICATE OF CORRECTION

Patent No. 3,389,965                               June 25, 1968

Hendrikus de Ruiter et al.

It is certified that error appears in the above identified patent and that said Letters Patent are hereby corrected as shown below:

Column 1, lines 23 and 70, and column 6, line 59, "V-III", each occurrence, should read -- VIII --.

Signed and sealed this 3rd day of March 1970.

(SEAL)
Attest:

Edward M. Fletcher, Jr.                     WILLIAM E. SCHUYLER, JR.
Attesting Officer                              Commissioner of Patents